United States Patent
Lacoss-Arnold (10) Patent No.: US 9,972,301 B2
(45) Date of Patent: May 15, 2018

(54) SYSTEMS AND METHODS FOR CORRECTING TEXT-TO-SPEECH PRONUNCIATION

(71) Applicant: MasterCard International Incorporated, Purchase, NY (US)

(72) Inventor: Jason Jay Lacoss-Arnold, St. Louis, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days. days.

(21) Appl. No.: 15/296,888

(22) Filed: Oct. 18, 2016

(65) Prior Publication Data

US 2018/0108344 A1  Apr. 19, 2018

(51) Int. Cl.
| | | |
|---|---|---|
| G10L 13/00 | (2006.01) |
| G10L 13/08 | (2013.01) |
| G06F 3/0481 | (2013.01) |
| G10L 13/047 | (2013.01) |

(52) U.S. Cl.
CPC ............ G10L 13/08 (2013.01); G06F 3/0481 (2013.01); G10L 13/047 (2013.01)

(58) Field of Classification Search
CPC ....... G10L 13/00; G10L 13/043; G10L 13/06; G10L 13/07; A63B 2024/0056; A63B 2071/0638; A63B 2071/0691; A63B 2220/14; A63B 2220/20
USPC ...... 704/200, 243, 2, 260; 345/473; 348/157
See application file for complete search history.

(56) References Cited

U.S. PATENT DOCUMENTS

| | | | | |
|---|---|---|---|---|
| 5,243,685 A | * | 9/1993 | Laurent | G10L 19/06 704/200 |
| 6,343,270 B1 | | 1/2002 | Bahl et al. | |
| 6,470,312 B1 | * | 10/2002 | Suzuki | G10L 19/08 704/200.1 |
| 6,520,864 B1 | * | 2/2003 | Wilk | A63B 24/0006 473/152 |
| 6,646,604 B2 | * | 11/2003 | Anderson | G01S 5/02 342/463 |
| 6,665,641 B1 | * | 12/2003 | Coorman | G10L 13/06 704/258 |
| 7,023,979 B1 | * | 4/2006 | Wu | H04M 3/5233 379/265.11 |
| 7,027,054 B1 | * | 4/2006 | Cheiky | G06T 13/40 345/473 |
| 7,711,562 B1 | | 5/2010 | Davis et al. | |
| 7,742,919 B1 | | 6/2010 | Davis et al. | |

(Continued)

*Primary Examiner* — Michael Colucci
(74) *Attorney, Agent, or Firm* — Armstrong Teasdale LLP (57) ABSTRACT

A text-to-speech (TTS) computing includes a processor and a memory. The TTS computing device is configured to generate a machine pronunciation of a text data according to at least one phonetic rule, and provide the machine pronunciation to a user interface of the TTS computing device such that the machine pronunciation is audibly communicated to a user of the TTS computing device. The TTS computing device is also configured to receive a pronunciation correction of the machine pronunciation from the user via the user interface, and store the pronunciation correction in a TTS data source. The TTS computing device is further configured to assign the pronunciation correction provided by the user to a user profile that corresponds to the text data.

18 Claims, 5 Drawing Sheets

(56) References Cited

U.S. PATENT DOCUMENTS

| | | | |
|---|---|---|---|
| 7,844,461 B2* | 11/2010 | Yamada | G10L 13/033 704/220 |
| 8,073,694 B2 | 12/2011 | Davis et al. | |
| 8,290,775 B2 | 10/2012 | Etezadi et al. | |
| 8,447,609 B2* | 5/2013 | Raffa | G10L 13/00 704/258 |
| 8,826,137 B2* | 9/2014 | Hofstader | G09B 21/006 704/260 |
| 8,949,125 B1* | 2/2015 | Chechik | G10L 13/02 701/409 |
| 8,972,268 B2 | 3/2015 | Waibel et al. | |
| 9,275,633 B2 | 3/2016 | Cath et al. | |
| 2007/0094029 A1* | 4/2007 | Saito | G10L 13/033 704/260 |
| 2010/0007665 A1* | 1/2010 | Smith | G06T 13/40 345/473 |
| 2011/0307241 A1* | 12/2011 | Waibel | G10L 15/265 704/2 |
| 2013/0179170 A1* | 7/2013 | Cath | G10L 13/08 704/260 |
| 2015/0297949 A1* | 10/2015 | Aman | G06T 7/246 348/157 |

\* cited by examiner

SYSTEMS AND METHODS FOR CORRECTING TEXT-TO-SPEECH PRONUNCIATION

BACKGROUND

The field of the disclosure relates generally to text-to-speech (TTS) systems, and more particularly, to network-based systems and methods for correcting text-to-speech pronunciation.

Text-to-speech (TTS) systems typically convert text objects, for example location names, road names, and/or business names, to an auditory speech object that may be heard by a user. These systems may facilitate visually impaired persons to understand text in an electronic file, may facilitate hands-free device usage such as during navigation and direction, and may also facilitate reading electronic files to a user such that the user may interact with the file and make selections and/or amend the text objects therein. Generally, the TTS systems rely on phonetic rules and/or analysis to determine the pronunciation of words and phrases converted from the text objects to the auditory speech objects provided to the user.

One example is a map-based navigation system. At least some known navigation systems include a TTS system that reads directions and/or locations, such as directions to a point-of-interest or a service location (e.g., an automatic teller machine (ATM)), to the user during the course of navigation. Another example is a reader system that may read electronic text files to the user. In some such systems, the TTS system relies on general phonetic rules to generate auditory speech objects of location names and/or business names to the user. However, in many geographical areas, location and business names may be based on dialects other than the geographical area's spoken language. Additionally, location names and/or business names may be considered slang, wherein the local pronunciation does not follow any typical phonetic rules. As such, pronunciation errors in the TTS systems may inconvenience the user. Local users within the geographical area may not trust the TTS systems when hearing location and/or business names that sound unfamiliar and incorrect due to pronunciation errors. If such local users feel that the TTS system is unreliable, they may stop using the TTS system. In light of the foregoing, it would be useful to have a TTS system that allows users to correct TTS pronunciation errors.

BRIEF DESCRIPTION OF THE DISCLOSURE

In one aspect, a text-to-speech (TTS) computing device is disclosed. The TTS computing device includes one or more processors in communication with one or more memory devices and is configured to: generate a machine pronunciation of a text data according to at least one phonetic rule; provide the machine pronunciation to a user interface of the TTS computing device such that the machine pronunciation is audibly communicated to a user of the TTS computing device; receive a pronunciation correction of the machine pronunciation from the user via the user interface; store the pronunciation correction in a TTS data source; and assign the pronunciation correction provided by the user to a user profile that corresponds to the text data.

In a second aspect, a computer-implemented method for correcting pronunciation in a TTS system is provided. The method is implemented using a TTS computing device in communication with one or more memory devices. The method includes generating a machine pronunciation of a text data according to at least one phonetic rule; providing the machine pronunciation to a user interface of the TTS computing device such that the machine pronunciation is audibly communicated to a user of the TTS computing device; receiving a pronunciation correction of the machine pronunciation from the user via the user interface; storing the pronunciation correction in a TTS data source; and assigning the pronunciation correction provided by the user to a user profile that corresponds to the text data.

In yet another aspect, a non-transitory computer readable medium that includes computer executable instructions for correcting pronunciation in a TTS system is provided. When executed by a TTS computing device including at least one processor in communication with at least one memory device, the computer executable instructions cause the TTS computing device to: generate a machine pronunciation of a text data according to at least one phonetic rule; provide the machine pronunciation to a user interface of the TTS computing device such that the machine pronunciation is audibly communicated to a user of the TTS computing device; receive a pronunciation correction of the machine pronunciation from the user via the user interface; store the pronunciation correction in a TTS data source; and assign the pronunciation correction provided by the user to a user profile that corresponds to the text data.

BRIEF DESCRIPTION OF THE DRAWINGS

FIGS. 1-5 show example embodiments of the methods and systems described herein.

Like numbers in the figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The systems and methods described herein are directed to a text-to-speech (TTS) computing device that is configured to enable a user to correct pronunciation errors in an audible speech object, and the corrected pronunciation of the audible speech object is used when further generating the machine pronunciation. Additionally, corrected pronunciations submitted by users may be used in a TTS system to "crowd-source" machine pronunciations.

The TTS computing device converts text data to an audible machine pronunciation for a user to listen to, instead of the user reading the text data on the device. The text data may include a single word, a combination of words such as a phrase or a sentence, an abbreviation and/or acronym of a word or phrase, a name, a name of a business, or any other term that may be spoken or recited. For example, the text data may include location names, such as, but not limited to, city names, road names, business names, and terrain features. In another example, the text data may include an abbreviation and/or an acronym. The TTS computing device typically generates the machine pronunciation of these location names and/or abbreviations of the text data according to at least one phonetic rule stored in a TTS data source. In general, phonetic rules are used to determine how a machine pronunciation is generated from text data. For example, a phonetic rule may be that when a syllable has two vowels together, the first vowel is usually long and the second is silent.

Once the TTS computing device generates the machine pronunciation of the text data, the machine pronunciation may be provided to a user interface of the TTS computing device. The machine pronunciation may be audibly communicated to the user of the TTS system such that the user can hear and listen to the text data. In some embodiments, the TTS computing device is the TTS system, while in other embodiments, the TTS computing device may be in communication with a TTS server such that a plurality of TTS computing devices are integral to the TTS system to facilitate "crowdsourcing" of a corrected pronunciation.

Some of the machine pronunciations provided to the user interface may sound phonetically correct to the user when played back because the phonetic rules applied by the TTS computing device result in machine pronunciations that are recognizable to the user. However, some other machine pronunciations transmitted to the user interface may not sound phonetically correct to the user because the phonetic rules applied by the TTS computing device generate machine pronunciations that are only partially recognizable and/or fully unrecognizable to the user. As such, the TTS computing device in accordance with the present disclosure includes a user correction functionality that is configured to allow the user to override or supplement the stored text data with phonetically accurate corrected text data. The user provides the pronunciation correction to the TTS computing device via an input device included on the TTS computing device such that the TTS computing device is able to use the corrected pronunciation(s) later when the text data is accessed and recited by the TTS computing device.

For example, the text data may include a road name such as "Kings Highway." The machine pronunciation according to the stored phonetic rules, however, pronounces the text data as a single word "Kingshyway," which the user may consider a pronunciation error. As such, the user may provide a pronunciation correction to the TTS computing device, the pronunciation correction being "Kings Highway." In another example, the text data may include an abbreviation such as "Blvd." The machine pronunciation according to the stored phonetic rules, however, may pronounce the text data exactly how the letters are ordered. As such, the user may provide a pronunciation correction of "Boulevard" to the TTS computing device. In a further example, the text data may include a letter, such as letter "N" for Highway N, however, the letter is not an abbreviation for a direction "North." The machine pronunciation according to the stored phonetic rules, however, may pronounce the text data as an abbreviation for "North." As such, the user may provide a pronunciation correction of "Highway N" to the TTS computing device. As yet another example, the TTS computing device may generate a machine pronunciation that is incorrect due to, for example, the text having an origin in a foreign language or otherwise special pronunciation. For example, "Piasa Street" is a street located in Alton, Ill. "Piasa" is a Native American word pronounced "PIE-uh-saw," however, based on the phonetic rules of the TTS computing device, the generated machine pronunciation may be "pee-AH-zah." In such cases, the user may provide a pronunciation correction of "PIE-uh-saw" to the TTS computing device. In each of the above cases, the TTS computing device replaces or supplements the text data corresponding to the mispronounced text data with corrected text data that more accurately reflects the pronunciation provided by the user. Accordingly, the next time the text data is accessed and pronounced by the TTS computing device, the TTS computing device refers to the corrected text data to provide the corrected pronunciation. In another example, the text data may be credit card and/or billing statements, such that the TTS computing device is a reader system that reads the text data for verification purposes to the user.

The TTS computing device may receive the pronunciation correction from the user via a user interface. The pronunciation correction received from the user may be stored in the TTS data source where it is assigned to a user profile for the user providing the pronunciation correction and that corresponds to the text data for further use. As such, for the user providing the pronunciation correction to the TTS computing device, the pronunciation correction may be used for any additional occurrences when the text data is recited back to the user. In certain embodiments, the pronunciation correction may be stored in the TTS data source of the TTS computing device. In other embodiments, the pronunciation correction may be stored remotely in a TTS server and tagged within a user profile of the user for access over a network. For example, the pronunciation correction may be stored as one or more of an audio file containing the pronunciation correction provided by the user, an updated machine pronunciation, corrected text data that reflects a phonetic spelling of the pronunciation correction, and/or a modified phonetic rule.

In the example embodiment, the TTS computing device receives and/or stores the pronunciation correction as an audio file from the user. In certain embodiments, the TTS computing device translates the audio file into corrected text data in the form of a corrected phonetic spelling for the pronunciation correction received from the user. The corrected phonetic spelling is configured such that when the TTS computing device recites the corrected text data using the stored phonetic rules, the pronunciation matches the user's corrected pronunciation. The TTS computing device may then add the corrected text data to the user profile of the user. As such, during subsequent machine pronunciations of the text, the TTS computing device recites the corrected text data and pronounces the text data as corrected by the user. In addition to the corrected phonetic spelling, the corrected text data may include a regular spelling for displaying on the user interface, such that the visual representation of the text data does not change for the user. In other embodiments, TTS computing device stores the audio file and refers to the stored audio file when generating the updated machine pronunciation.

In other embodiments, pronunciation corrections are stored as machine pronunciation audio files. In such embodiments, the TTS computing device receives an audio file from the user and converts the audio file into a machine pronunciation audio file. Accordingly, during subsequent pronunciations of the corrected term(s), the TTS computing device plays back the machine pronunciation audio file that is based on the user input with the pronunciation correction. In certain embodiments, the machine pronunciation audio file is stored in or otherwise associated with the user profile of the user.

In still other embodiments, the pronunciation correction is stored as a modified phonetic rule. For example, if a user provides the pronunciation correction of "Piasa" as described above, the TTS computing device may generate one or more modified phonetic rules that result in the correct pronunciation. In the "Piasa" example, the corrected phonetic rules could be to pronounce "pi" as "pie" as opposed to "pee" and/or "sa" as "saw" instead of "zah." Accordingly, during subsequent pronunciations, the modified phonetic rules are applied to produce the proper pronunciation. In certain embodiments, the modified phonetic rules are applied only to the corrected text data. In others, the modified phonetic rule is applied to a plurality of text data when used in a particular geographic region, such that regional accents, regional influence of foreign languages, and the like are captured.

Examples and embodiments herein may refer to implementing pronunciation corrections using only one of audio files, corrected text data, or modified phonetic rules. Such examples are intended only as illustrations and any such examples should be understood to further embody the alternative methods of implementing pronunciation corrections described herein.

When the TTS computing device further generates an updated machine pronunciation, the updated machine pronunciation may be provided to the user interface such that the user is provided with pronunciation from the TTS computing device that is based on the user's prior pronunciation correction. Additionally, the TTS computing device stores the original text data such that the spelling for any visual representation of the corrected text data will not change for the user.

In other embodiments, the TTS computing device may generate the updated machine pronunciation based on a determination that the user is within a predefined geographical area corresponding to a location of the pronunciation correction. For example, the user may provide the pronunciation correction to "Kings Highway" in a first city, however, in a second city the local pronunciation may be "Kingshyway." As such, the TTS computing device, may determine a first location corresponding to a geographical area in which the pronunciation correction was provided by the user. The TTS computing device may also determine a second location corresponding to a current geographical area of the TTS computing device and thus the user. Based on the user's location as a phonetic rule, the text-to-speech computing device may provide either the original machine pronunciation or the updated machine pronunciation based on the updated text data. If the user is outside of a predetermined distance from the first location, then the TTS computing device may provide the original machine pronunciation based on the phonetic rules. If the user is inside the predetermined distance from the first location, then the TTS computing device may provide the correct machine pronunciation based on the user's corrected pronunciation, updated text data, and new phonetic rules. As such, the TTS computing device may include more than one pronunciation for the text data because local dialects and slang change throughout a plurality of geographical areas.

In still other embodiments, the TTS computing device may be connected to a network such that the TTS computing device may "crowdsource" pronunciation corrections, based on pronunciation corrections provided by a plurality of users in a TTS system. For example, the TTS computing device is a user computing device in remote communication with a TTS server. The pronunciation corrections received from each user of a plurality of users may be stored in the TTS server such that the phonetic rules used to generate an original machine pronunciation may be augmented by crowdsourcing the corrected pronunciations of one or more text data. As such, in certain embodiments, the TTS server may store the pronunciation corrections from the users in a TTS crowdsource data source. The TTS computing device may then apply at least one phonetic rule derived from the historical pronunciation corrections provided by users and stored in the TTS crowdsource data source to generate the initial/original machine pronunciation of the text data.

In certain embodiments, the pronunciation corrections derived from the crowdsourcing may include determining whether the pronunciation corrections of the text data and provided by the users exceed a predetermined threshold. For example, if 85% of users provide a pronunciation correction of "Highway N" for the machine pronunciation of "Highway North", then the original phonetic rules may be augmented or overridden with the crowdsourced corrected pronunciation such that any future reference will be recited by the TTS computing device as "Highway N." Additionally, in other embodiments, the TTS computing device may use the crowdsource pronunciation correction based on a determination that the user is within a predefined geographical area corresponding to the location of the user's TTS computing device and thus the user. For example, the TTS computing device may determine that in the first city "Kings Highway" is the most corrected pronunciation based on the crowdsourced pronunciation; however, in a second city, the original and/or crowdsourced pronunciation may be "Kingshyway." As such, the TSS computing device may determine whether pronunciation corrections for the text data exceeds a predetermined threshold for the geographic area that includes the location of the user.

In yet other embodiments, the TTS computing device may generate a first machine pronunciation according to a first phonetic rule and/or pronunciation correction and a second machine pronunciation according to a second phonetic rule and/or pronunciation correction, for example a rule or pronunciation determined by crowdsourcing. Both first and second machine pronunciations may then be provided to the user and the user selects one of the pronunciation options, whichever is more correct. This pronunciation correction may then be used for the text data and applied to the user's profile and/or saved for crowdsourcing.

In certain embodiments, the TTS computing device facilitates hands-free or similar pronunciation correction by the user. For example, in certain embodiments, the TTS computing device may be configured to permit the user to initiate a pronunciation correction by saying a particular phrase. For example, the user may, after hearing an incorrect pronunciation, say a phrase such as "correction," "correction that," "fix pronunciation," "wrong pronunciation," and the like. By doing so, the user causes the TTS computing device to transition into an "update mode", or to open an audio input channel in order to receive a pronunciation correction. The user is then able to speak the pronunciation correction to the TTS computing device. The pronunciation correction is then processed as necessary to facilitate use of the pronunciation correction during subsequent machine pronunciations of the corrected term(s). Additionally or alternatively, the user interface of the TTS computing device may provide other user input options to transition the TTS computing device into "update mode," including pushing a button or selecting a command on a touch screen interface.

The methods and systems described herein may be implemented using computer programming or engineering techniques including computer software, firmware, hardware or any combination or subset thereof, wherein the technical effect is achieved by performing at least one of: (a) generating a machine pronunciation of a text data according to at least one phonetic rule; (b) providing the machine pronunciation to a user interface of the TTS computing device such that the machine pronunciation is audibly communicated to a user of the TTS computing device; (c) receiving a pronunciation correction of the machine pronunciation from the user via the user interface; (d) storing the pronunciation correction in a TTS data source; and (e) assigning the pronunciation correction provided by the user to a user profile that corresponds to the text data.

The systems and methods described herein provide the technical advantages of at least one of: (a) reducing the likelihood that TTS systems translate speech that is partially recognizable and/or fully non-recognizable to a user; (b) convenient and efficient correction of the TTS system's machine translations; (c) increasing regional dialect capacity of the TTS systems; and (d) increased user satisfaction and interaction with the TTS system.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

Figure 1:
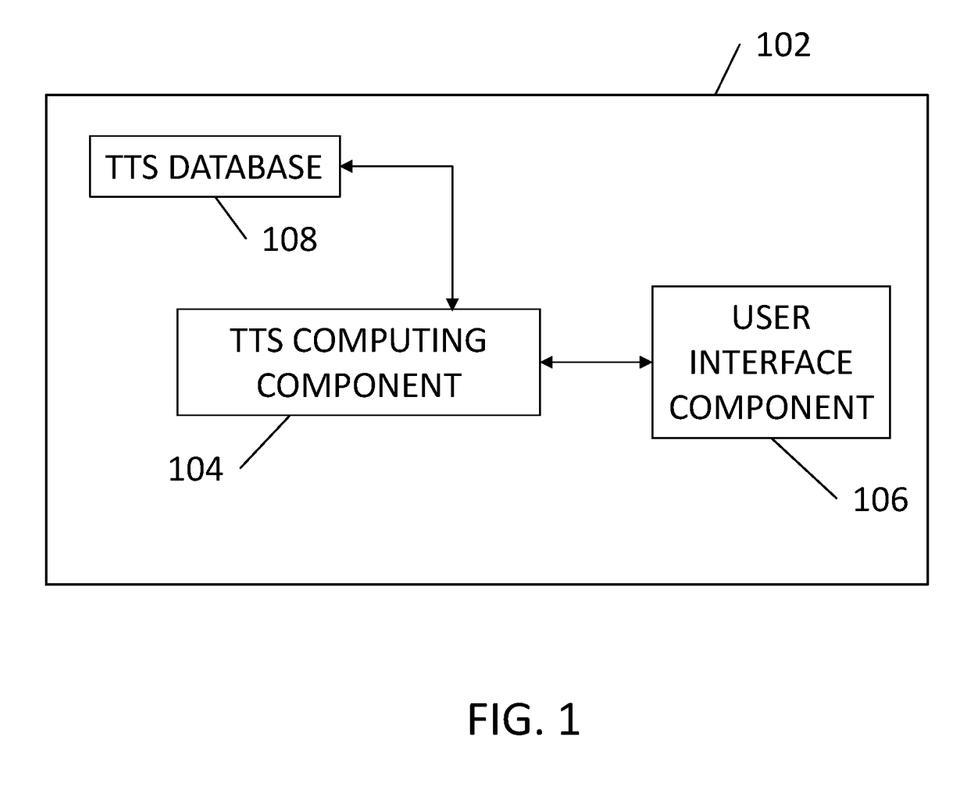
FIG. 1 is a schematic showing an example text-to-speech (TTS) computing device that enables correction of pronunciation errors in accordance with the present disclosure.

FIG. 1 is a schematic showing an example text-to-speech (TTS) computing device 102 that enables correction of pronunciation errors in accordance with the present disclosure. TTS computing device 102 includes one or more computing components specifically programmed to perform the functions described further herein. In the illustrated embodiment, TTS computing device 102 includes a TTS computing component 104 and a user interface component 106. TTS computing component 104 is in communication with a TTS database (memory) 108, which contains a variety of information and data. For example, TTS database 108 includes a TTS data source including at least one phonetic rule, pronunciation corrections corresponding to text data, location data corresponding to the pronunciation corrections, and/or one or more user profiles. In some embodiments, TTS database 108 is local to TTS computing device 102. In other embodiments, TTS database 108 may be remote from TTS computing device 102.

During operation, TTS computing component 104 converts text data from TTS database 108 to an audible machine pronunciation that is communicated to the user. For example, TTS computing component 104 may receive text data and generate a machine pronunciation of the text data according to at least one phonetic rule stored in the TTS database 108. TTS computing component 104 may then provide the machine pronunciation to the user via user interface component 106, which plays back the machine pronunciation such that the user may hear the text data instead of reading the text data. If the machine pronunciation from TTS computing component 104 is phonetically incorrect to the user, then the user may provide a pronunciation correction to user interface component 106. The pronunciation correction is then stored within TTS database 108 for further use.

During the next occurrence that TTS computing device 102 generates the machine pronunciation of the text data, TTS computing component 104 generates an updated machine pronunciation of the text data based on the pronunciation correction provided by the user. The updated machine pronunciation is then provided to the user via user interface component 106 such that the pronunciation of the text data is now based on, and in accordance with, the user's original pronunciation correction.

In certain embodiments, TTS computing device 102 may also determine location data corresponding to the geographical location of TTS computing device 102 (and/or the user thereof) during the pronunciation correction. As such, TTS computing component 104 may generate the machine pronunciation based on a geographic location of the user. For example, TTS computing component 104 determines a location of the pronunciation correction and also determines a current location of the user via location services, for example, through a global positioning system (GPS) module. TTS computing device 102 then provides via user interface component 106 the original machine pronunciation if the user is outside of a predetermined geographical area corresponding to the geographical location of the pronunciation correction. If the user is inside of a predetermined geographical area corresponding to the geographical location of the pronunciation correction, then TTS computing component 104 provides the updated machine pronunciation. By relating text data pronunciation with geographical area, TTS computing device 102 facilitates a system that improves pronunciations in local dialects and provides a more robust system for the user.

Additionally, TTS computing component 104 may generate more than one machine pronunciation of the text data, for example a first machine pronunciation according to a first phonetic rule and/or pronunciation correction and a second machine pronunciation according to a second phonetic rule and/or pronunciation correction, and provide each to the user. The user may then select or provide a pronunciation correction that is either the first machine pronunciation or the second machine pronunciation, which is received by TTS computing device 102. By generating more than one machine pronunciation, TTS computing device 102 interacts with the user and builds a larger source of pronunciation corrections for use in the system.

In the example embodiment, TTS computing component 104 receives and/or stores the pronunciation correction as an audio file from the user. In certain embodiments, TTS computing component 104 translates the audio recording into corrected text data in the form of a corrected phonetic spelling. The corrected phonetic spelling is such that when TTS computing component 104 next recites the corrected text data using the stored phonetic rules, the pronunciation matches the user's corrected pronunciation. TTS computing component 104 may then add the corrected text data to the user profile of the user. In addition to the corrected phonetic spelling, the corrected text data may include a regular spelling for displaying on the TTS computing device 102, such that the visual representation of the term(s) do not change for the user. In other embodiments, TTS computing component 104 stores the audio file and refers to the stored audio file when generating the updated machine pronunciation.

In other embodiments, pronunciation corrections are stored as machine pronunciation audio files. In such embodiments, TTS computing component 104 receives an audio file from user and converts the audio file into a machine pronunciation audio file. Accordingly, during subsequent pronunciations of the corrected term(s), TTS computing device 102 plays back the machine pronunciation audio file. In certain embodiments, the machine pronunciation audio file is stored in or otherwise associated with the user profile of the user.

In still other embodiments, the pronunciation correction is stored as a modified phonetic rule. For example, if a user provides the pronunciation correction of "Piasa" as described above, TTS computing component 104 may generate one or more modified phonetic rules that result in the correct pronunciation. In the "Piasa" example, the corrected phonetic rules could be to pronounce "pi" as "pie" as opposed to "pee" and/or "sa" as "saw" instead of "zah." Accordingly, during subsequent pronunciations, the modified phonetic rules are applied to produce the proper pronunciation. In certain embodiments, the modified phonetic rules are applied only to the corrected term(s). In others, the modified phonetic rule is applied when used in a particular geographic region such that regional accents, regional influence of foreign languages, and the like are captured.

Figure 2:
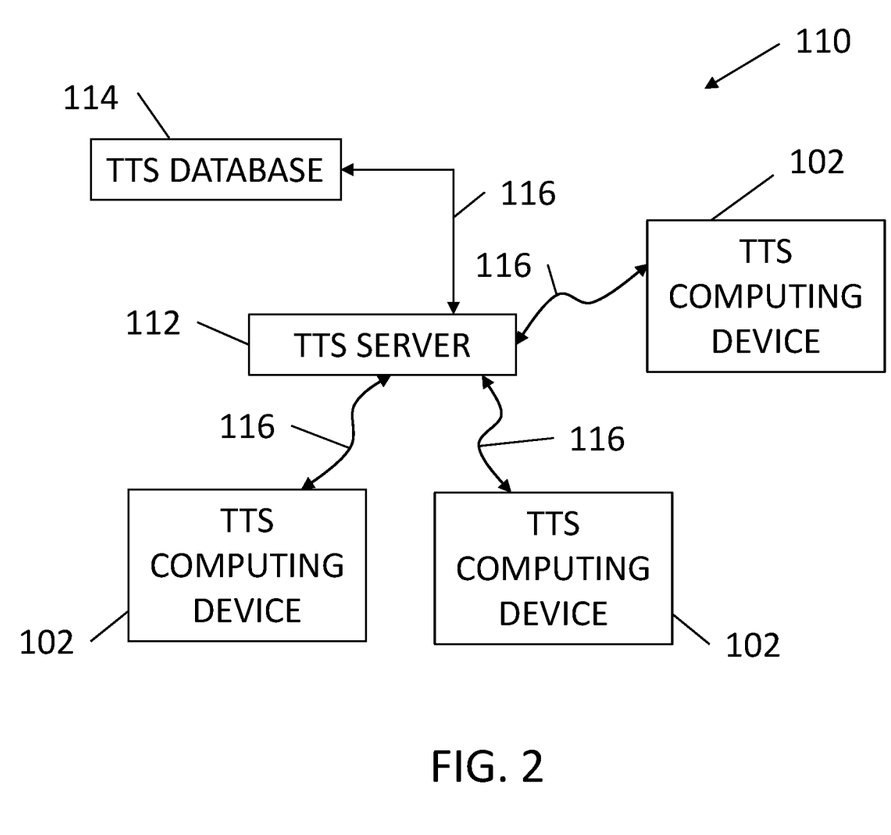
FIG. 2 is a schematic showing of a TTS system that may be used with the TTS computing device shown in FIG. 1.

FIG. 2 is a schematic showing of an example TTS system 110 that may include TTS computing device 102 shown in FIG. 1. In the exemplary embodiment, TTS system 110 includes a plurality of TTS computing devices 102 that are in communication with a TTS server 112. TTS server 112 is in communication with a TTS database (memory) 114, which contains a variety of information and data, as described below in greater detail. In one embodiment, TTS database 114 is stored on TTS server 112. In alternative embodiments, TTS database 114 is stored remotely from TTS server 112 and may be non-centralized. TTS database 114 may include a single database having separated sections or partitions or may include multiple databases, each being separate from each other. For example, TTS database 114 includes a TTS data source associated with at least one phonetic rule, pronunciation corrections corresponding to text data, location data corresponding to the pronunciation corrections, and one or more user profiles. TTS database 114 may also include a TTS crowdsource data source also associated with at least one phonetic rule, pronunciation corrections corresponding to text data, location data corresponding to the pronunciation corrections, and one or more user profiles.

TTS system 110 facilitates communication between a plurality of client subsystems—also referred to as client systems, user computing devices, or TTS computing devices 102—and TTS server 112 via a network 116. Network 116 may include the Internet and/or one or more other networks. For example, a connection between the computing devices may include a wireless network, a wired network, a telephone network, a cable network, a combination thereof, and the like. Examples of a wireless network include networks such as WiFi, WiMAX, WiBro, local area network, personal area network, metropolitan area network, cellular, Bluetooth, and the like.

TTS computing devices 102 may each be associated with a respective user, such as a user 202 (shown in FIG. 3) interested in accessing the TTS services of TTS server 112. TTS computing device 112 may include any computing device such as a smart phone, laptop, desktop, tablet, wearable device (e.g., a "smart watch"), and/or any other computing device. Although three TTS computing devices 102 are shown in FIG. 2, it is understood that TTS system 110 may include any number of TTS computing devices 102. TTS server 112 facilitates access to TTS computing devices 102 such that a user thereof may request and receive TTS information.

During operation, TTS computing device 102 converts text data to an audible machine pronunciation for the user. For example, TTS computing device 102 may have a system, such as a navigation system and/or electronic reader system, that is associated with TTS system 110m such that the user may receive audible speech from TTS computing device 102 instead of visually reading text data. Instead of locally storing information within TTS computing device 102, TTS computing device 102 is in communication with TTS server 112 such that it may receive text data and generate a machine pronunciation of the text data according to at least one phonetic rule stored in the TTS server 112. Similar to a local system, as described in reference to FIG. 1, the TTS computing device 102 may provide the machine pronunciation to the user, which plays back the machine pronunciation such that the user may hear the text data instead of reading the text data. If the machine pronunciation from TTS computing device 102 is phonetically incorrect to the user, then the user may provide a pronunciation correction. The pronunciation correction is then stored locally and/or transmitted to and received by TTS server 112, where it is stored within TTS database 114 for further use. TTS server 112 may assign the pronunciation correction to a user profile of the user, such that the pronunciation correction overrides the phonetic rules of for the next occurrence that TTS computing device 102 generates the machine pronunciation of the text data. In certain embodiments, TTS server 112 may also store the pronunciation correction for crowdsourcing the phonetic rules.

In other embodiments, TTS computing device 102 may further facilitate pronunciation correction by crowdsourcing the machine pronunciation based on pronunciation corrections provided by other users of TTS system 110. In addition to storing the pronunciation correction in connection with the user's profile, the pronunciation correction may also be stored in a crowdsource data source (not specifically shown). If the number of pronunciation corrections for the text data stored in the crowdsource data source exceeds a predetermined threshold, then the machine pronunciation that TTS computing device 102 generates may be based on the pronunciation corrections from the crowdsource data source and stored in TTS server 112. However, if the number of pronunciation corrections for the text data does not exceed the predetermined threshold, then the machine pronunciation is based on the original phonetic rules. By requiring that the crowdsourced pronunciation corrections exceed a predetermined threshold, for example 85% of users, TTS system 110 may regulate the crowdsourced corrections.

TTS computing device 102 may further crowdsource the initial machine pronunciation based on crowdsourcing within a geographic area that the user is currently located. For example, TTS computing device 102 determines a current location of the user. Based on this location, TTS computing device 102 determines if the pronunciation corrections corresponding to the geographical area for the text data stored in the crowdsource data source exceed a predetermined threshold for the geographic area that includes the user. The machine pronunciation that TTS computing device 102 generates may then be based on the pronunciation corrections from the crowdsource data source and stored in TTS server 112. However, if the pronunciation corrections corresponding to the geographical area for the text data do not exceed the predetermined threshold, then the machine pronunciation is based on the original phonetic rules. By relating crowdsourced text data pronunciation with geographical area, TTS system 110 facilitates a system that increased pronunciation of local dialects and provides a more robust system for the user.

Figure 3:
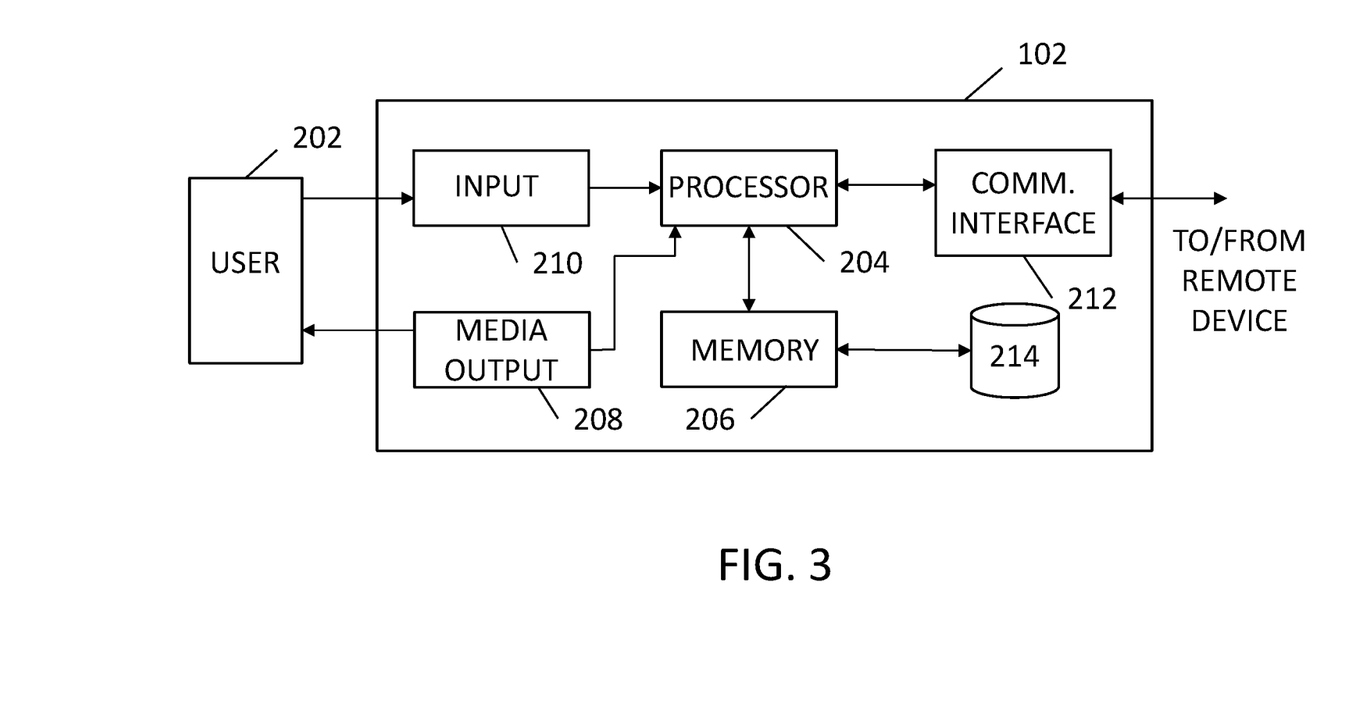
FIG. 3 is an example configuration of the TTS computing device shown in FIGS. 1 and 2.

FIG. 3 is an example configuration of TTS computing device 102 (shown in FIGS. 1 and 2). In some embodiments, TTS computing device 102 is a local TTS system (shown in FIG. 1). In other embodiments, TTS computing device 102 may be used with TTS system 110 (shown in FIG. 2). In the exemplary embodiment, TTS computer device 102 includes a processor 204 for executing instructions. In some embodiments, executable instructions are stored in a memory area 206. Processor 204 may include one or more processing units (e.g., in a multi-core configuration) for executing instructions. Memory area 206 is any device allowing information such as executable instructions and/or other data to be stored and retrieved. Memory area 206 may include one or more computer-readable media.

TTS computing device 102 may also include at least one media output component 208 for presenting information to user 202. Media output component 208 may be any component capable of conveying information to user 202. For example, media output component 208 includes an output adapter such as an audio adapter and/or a video adapter. The output adapter is operatively coupled to processor 204 and operatively couplable to an output device such as an audio output device, such as a speaker or headphones, or a display device, such as a liquid crystal display, organic light emitting diode display, or "electronic ink" display. Stored in memory area 206 are, for example, computer readable instructions for providing a user interface to user 202 via media output component 208.

In certain embodiments, TTS computing device 102 includes an input device 210 for receiving input for user 202. Input device 210 may include, for example, an audio input device such as a microphone, a keyboard, a pointing device, a mouse, a stylus, a touch sensitive panel, a touch pad, a touch screed, a gyroscope, an accelerometer, or a position detector. A single component such as a touch screen may function as both an output device of media output component 208 and input device 210.

TTS computing device 102 may also include a communication interface 212 operatively coupled to processor 204 such that TTS computing device 102 facilitates communication with one or more remote devices including, but not limited to, external storage devices, client computing devices, and other computing devices. Communication interface 212 may include, for example, a wired or wireless network adapter or a wireless data transceiver for use with a mobile phone network such as GSM, 3G, 4G, or any other mobile data network or WIMAX.

Stored in memory area 206 are, for example, computer readable instructions for providing a user interface to user 202 via media output component 208, and optionally, receiving and processing input from input device 210. A user interface may include, among other possibilities, a web browser and client application. Web browsers enable users 202 to display and interact with media and other information typically embedded on a web page or website from a web server associated with the TTS server 112 (shown in FIG. 2). A client application allows users 202 to interact with a server application associated with, for example, TTS server 112.

In general, TTS computing device 102 generates a machine pronunciation for the text data that is output to user 202, for example, by an audio output device such as a speaker of the media output component 208. Upon listening to the machine pronunciation, user 202 may provide a pronunciation correction of the machine pronunciation through input device 210, such as an audio input device. TTS computing device 102 may store the pronunciation correction and/or any location data of user in a TTS data source 214 of memory 206. In other embodiments, the pronunciation correction is additionally transmitted to TTS server 112 for crowdsourcing.

In certain embodiments, TTS computing device 102 may store the audio file and/or a pronunciation correction corresponding to the audio file. For example, TTS computing device 102 may generate a pronunciation correction by translating the audio file into corrected text data in the form of a corrected phonetic spelling for the corrected term(s) contained in the audio file. In other embodiments, TTS computing device 102 generates a pronunciation correction by creating a machine pronunciation audio file based on the audio file provided by the user and stores the machine pronunciation. TTS computing device 102 may store the pronunciation correction such that it is associated with a user profile.

During the next occurrence that TTS computing device 102 generates the machine pronunciation of the text data, TTS computing device 102 generates an updated machine pronunciation of the text data based on the pronunciation correction provided by the user. The updated machine pronunciation is then provided to the user such that the pronunciation of the text data is now based on, and in accordance with, the user's original pronunciation correction now stored by TTS computing device 102.

In certain embodiments, TTS computing device 102 may also store location data in TTS data source 214 corresponding to the geographical location of the user during the pronunciation correction. As such, TTS computing device 102 may generate the updated machine pronunciation based on a geographic location of the user. For example, TTS computing device 102 determines a location of the pronunciation correction and determines a current location of the user, for example, through a GPS module. TTS computing device 102 then provides the original machine pronunciation if the user is outside of a predetermined geographical area corresponding to the geographical location of the pronunciation correction. If the user is inside of a predetermined geographical area corresponding to the geographical location of the pronunciation correction, then TTS computing device 102 provides the updated machine pronunciation.

Figure 4:
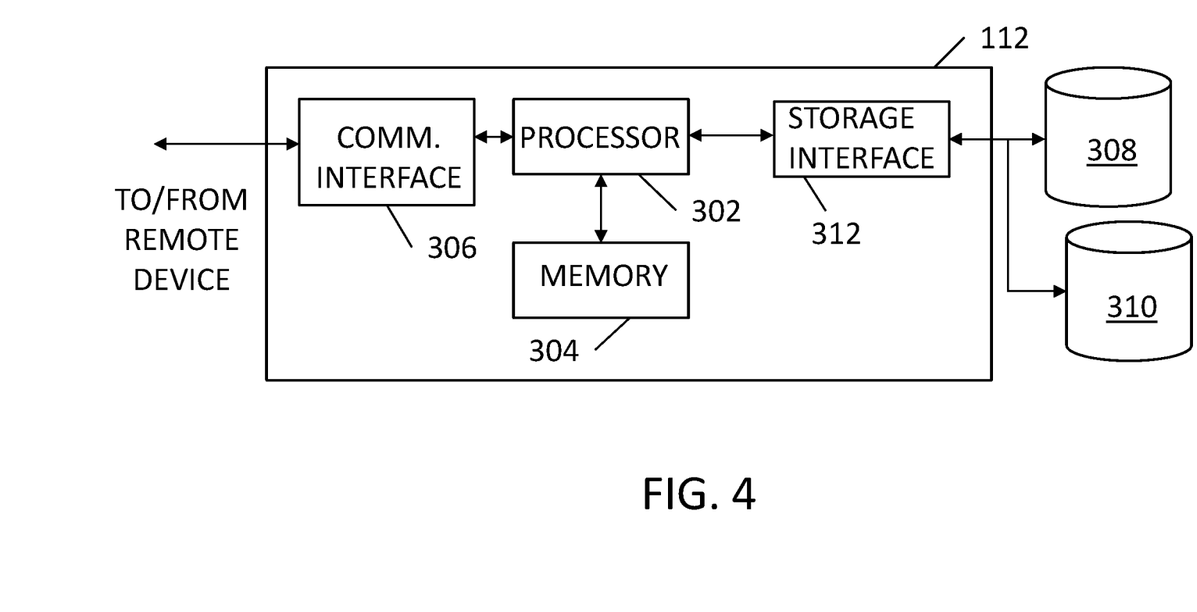
FIG. 4 is an example configuration of a TTS server device that may be used in the TTS system shown in FIG. 2.

FIG. 4 is an example configuration of a TTS server 112 that may be used in TTS system 110 (shown in FIG. 2). In the exemplary embodiment, TTS server 112 includes a processor 302 for executing instructions. Instructions may be stored in a memory area 304, for example. Processor 302 may include one or more processing units (e.g., in a multi-core configuration) for executing instructions. The instructions may be executed within a variety of different operating systems on TTS server 112, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 302 is operatively coupled to a communication interface 306 such that TTS server 112 is capable of communication with one or more remote device including, but not limited to, external storage devices, client computing devices, and other computing devices. Communication interface 306 may include, for example, a transceiver, a transmitter, a receiver, an Ethernet communication interface, an RS-485/EIA-485 communication interface, a GPIB communications interface, a programmable logic controller, an RS-322 communication interface, and/or any other communication interface device and/or component. For example, communication interface 306 may receive requests (e.g., request to generate a machine pronunciation of text data) from a TTS computing device 102 via the Internet, as illustrated in FIG. 2.

Processor 302 may also be operatively coupled to one or more storage devices, including, TTS data source 308 and TTS crowdsource data source 310. Storage devices 308 and 310 may be any computer-operated hardware suitable for storing and/or retrieving data. In some embodiments, one or more storage devices 308 and 310 are integrated in TTS server 112. For example, storage devices 308 and 310 may include multiple storage units such as hard disks or solid state disks in a redundant array of inexpensive disks (RAID) configuration. The storage devices 308 and 310 may include a storage area network (SAN) and/or a network attached storage (NAS) system.

In some embodiments, processor 302 is operatively coupled to storage devices 308 and 310 via a storage interface 312. Storage interface 312 is any component capable of providing processor 302 with access to storage devices 308 and 310. Storage interface 312 may include, for example, an Advanced Technology Attachment (ATA) adapter, a Serial ATA (SATA) adapter, a Small Computer System Interface (SCSI) adapter, a RAID controller, a SAN adapter, and/or any component providing processor 302 with access to storage devices 308 and 310.

Memory area 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In general, TTS server 112 is in communication with TTS computing device 102, such that TTS computing device 102 facilitates generating an audible machine pronunciation of text data for the user. TTS server 112 may further augment some of the phonetic rules and crowdsource the original/initial machine pronunciation based on the pronunciation corrections stored in TTS crowdsource data source 310 and provided by the users via TTS computing devices 102. If the pronunciation corrections for the text data stored in TTS crowdsource data source 310 exceed a predetermined threshold, then the machine pronunciation that TTS computing device 102 generates may be based on the pronunciation corrections from TTS crowdsource data source 310. However, if the pronunciation corrections for the text data do not exceed the predetermined threshold, then the machine pronunciation is based on the original phonetic rules.

TTS server 112 may further crowdsource the initial machine pronunciation based on crowdsourcing within a geographic area that the user and TTS computing device 102 is currently located. For example, TTS computing device 102 determines a current location of the user. Based on this location, TTS server 112 determines if the pronunciation corrections corresponding to the geographical area for the text data stored in TTS crowdsource data source 310 exceed a predetermined threshold for the geographic area that includes the TTS computing device 102. The machine pronunciation rules that TTS server 112 generates may then be based on the pronunciation corrections from TTS crowdsource data source 310. However, if the pronunciation corrections corresponding to the geographical area for the text data do not exceed the predetermined threshold, then the machine pronunciation is based on the original phonetic rules.

Additionally, TTS server 112 may transmit more than one machine pronunciation of the text data, for example a first machine pronunciation according to a first phonetic rule and a second machine pronunciation according to a second phonetic rule, and transmit each to TTS computing device 102. TTS computing device 102 may then receive a pronunciation correction that is either the first machine pronunciation or the second machine pronunciation. This pronunciation correction then may be stored in the user profile in TTS data source 308 and/or stored in TTS crowdsource data source 310.

Figure 5:
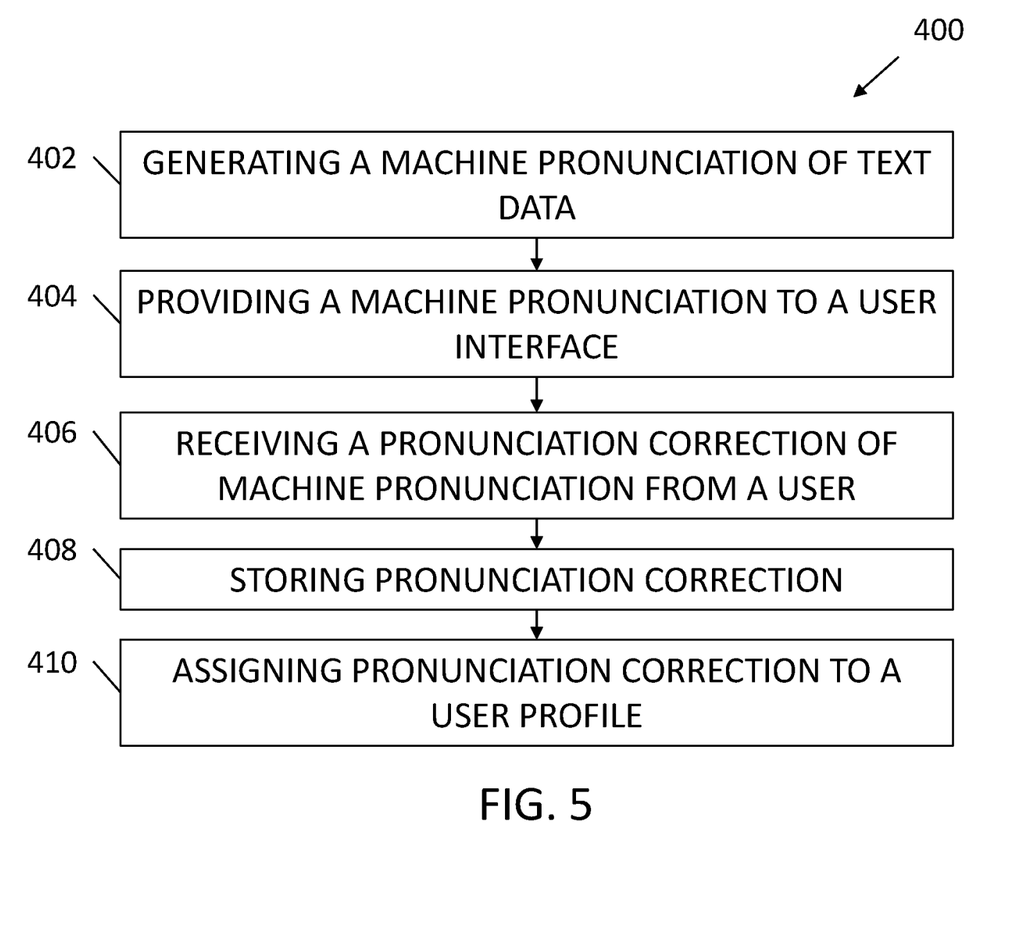
FIG. 5 is a flow chart illustrating an example method for correcting pronunciation errors using the TTS computing device shown in FIG. 1.

FIG. 5 is a flow chart illustrating an example of a method 400 for correcting pronunciation in a text-to-speech (TTS) system using a TTS computing device in communication with one or more memory devices, such as TTS computing device 102 (shown in FIG. 1).

The TTS computing device of method 400 facilitates generating 402 a machine pronunciation of a text data according to at least one phonetic rule. Method 400 includes providing 404 the machine pronunciation to a user interface, such as media output 208, of a TTS computing device, such as TTS computing device 102 (shown in FIG. 3). The TTS computing device receives 406 a pronunciation correction of the machine pronunciation from the user, such as user 202, via the user interface. In certain embodiments, the pronunciation correction is provided as an audio file.

In certain embodiments, the TTS computing device facilitates hands-free or similar pronunciation correction by the user. For example, in certain embodiments, the TTS computing device may be configured to permit the user to initiate a pronunciation correction by saying a particular phrase. For example, the user may, after hearing an incorrect pronunciation, say a phrase such as "correction," "correction that," "fix pronunciation," "wrong pronunciation," and the like. By doing so, the user causes the TTS computing device to open an audio input channel in order to receive a pronunciation correction. The user is then able to speak the require pronunciation correction to the TTS computing device. The pronunciation correction is then processed as necessary to facilitate use of the pronunciation correction during subsequent machine pronunciations of the corrected term(s).

Method 400 further includes storing 408 the pronunciation correction in a TTS data source. In embodiments in which the pronunciation correction is provided as an audio file from the TTS computing device, storing the pronunciation correction in the TTS data source may include translating the audio file into corrected text data in the form of a corrected phonetic spelling for the corrected term or terms received from the user. Storing the pronunciation correction may further include storing a regular spelling of the corrected pronunciation such that the regular spelling may be properly displayed on the computing device. Method 400 also includes assigning 410 the pronunciation correction provided by the user to a user profile that corresponds to the text data.

In certain embodiments, the TTS computing device further facilitates generating an updated machine pronunciation of the text data according to the pronunciation correction provided by the user, and providing the updated machine pronunciation to the user interface. In some embodiments, the TTS computing device also determines a first location of the pronunciation correction provided by the user, determines a second location of the TTS computing device, and then transmits at least one of the machine pronunciation and the updated machine pronunciation to the user interface based on whether the second location of the TTS computing device is within a predetermined distance of the first location of the pronunciation correction.

In other embodiments, the TTS computing device is a user computing device in communication with a TTS server, such as TTS server 112. The TTS computing device stores the pronunciation corrections in the TTS crowdsource data source via TTS server, such that at least one phonetic rule is derived from the pronunciation correction. For example, in some embodiments, the at least one phonetic rule includes determining whether pronunciation corrections for the text data stored in the TTS crowdsource data source exceeds a predetermined threshold. TTS computing device may further determine a location of the TTS computing device such that the at least one phonetic rule includes determining whether the pronunciation corrections for the text data stored in the TTS crowdsource data source exceeds a predetermined threshold for a geographic area that includes the location of the TTS computing device.

In certain embodiments, the TTS computing device further facilitates providing both a first and a second machine pronunciation to the user, and receiving a pronunciation correction from the user, wherein the pronunciation correction is at least one of the first machine pronunciation and the second machine pronunciation provided by the user.

Any processor in a computing device referred to herein may refer to one or more processors wherein the processor may be in one computing device or a plurality of computing devices acting in parallel. Additionally, any memory in a computing device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for correcting pronunciation in TTS systems. In this example, the computing device may include a memory device and a processor in communication with the memory device, and when executed by said processor, the computer-executable instructions may cause the processor to perform a method, such as the methods described and illustrated in the examples of FIG. 5.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A text-to-speech (TTS) computing device comprising one or more processors in communication with one or more memory devices, the TTS computing device configured to:

generate a machine pronunciation of a text data according to at least one phonetic rule;
provide the machine pronunciation to a user interface of the TTS computing device such that the machine pronunciation is audibly communicated to a user of the TTS computing device;
receive a pronunciation correction of the machine pronunciation from the user via the user interface;
determine a first geographic location indicating where the pronunciation correction was provided by the user to the user interface;
store the pronunciation correction and the first geographic location in a TTS data source;
assign the pronunciation correction provided by the user to a user profile that corresponds to the text data;
determine a second geographic location indicating where the TTS computing device is currently located;
provide, to the user interface, the machine pronunciation if the second geographic location is outside of a predetermined distance of the first geographic location; and
provide, to the user interface, an updated machine pronunciation based on the pronunciation correction if the second geographic location is within the predetermined distance of the first geographic location.

2. The TTS computing device of claim 1, wherein said TTS computing device if further configured to translate the pronunciation correction received from the user from audio data to an updated text data for use in generating the machine pronunciation.

3. The TTS computing device of claim 1, wherein said TTS computing device is further configured to:
generate the updated machine pronunciation of the text data according to the pronunciation correction provided by the user.

4. The TTS computing device of claim 1, wherein said TTS computing device is a user computing device in communication with a TTS server.

5. The TTS computing device of claim 4, wherein said TTS computing device is further configured to transmit the pronunciation correction to a TTS crowdsource data source of the TTS server.

6. The TTS computing device of claim 5, wherein the machine pronunciation is derived from the pronunciation correction stored in the TTS crowdsource data source when a number of a plurality of pronunciation corrections exceeds a predetermined threshold.

7. The TTS computing device of claim 6, wherein said TTS computing device is further configured to determine a location of the TTS computing device, wherein the at least one phonetic rule includes determining whether the plurality of pronunciation corrections in the TTS crowdsource data source exceeds a predetermined threshold for a geographic area that includes the location of the TTS computing device.

8. The TTS computing device of claim 1, wherein the machine pronunciation of a text data includes a first machine pronunciation according to at least one first phonetic rule and a second machine pronunciation according to at least one second phonetic rule, said TTS computing device further configured to:
provide both the first and second machine pronunciation to the user interface; and
receive a pronunciation correction from the user, wherein the pronunciation correction is at least one of the first machine pronunciation and the second machine pronunciation provided by the user.

9. A computer-implemented method for correcting pronunciation in a text-to-speech (TTS) system, said method implemented using a TTS computing device in communication with one or more memory devices, said method comprising:
generating a machine pronunciation of a text data according to at least one phonetic rule;
providing the machine pronunciation to a user interface of the TTS computing device such that the machine pronunciation is audibly communicated to a user of the TTS computing device;
receiving a pronunciation correction of the machine pronunciation from the user via the user interface;
determining a first geographic location indicating where the pronunciation correction was provided by the user to the user interface;
storing the pronunciation correction and the first geographic location in a TTS data source;
assigning the pronunciation correction provided by the user to a user profile that corresponds to the text data;
determining a second geographic location indicating where the TTS computing device is currently located;
providing, to the user interface, the machine pronunciation if the second geographic location is outside of a predetermined distance of the first geographic location; and
providing, to the user interface, an updated machine pronunciation based on the pronunciation correction if the second geographic location is within the predetermined distance of the first geographic location.

10. The method of claim 9 further comprising translating the pronunciation correction received from the user from audio data to an updated text data for use in generating the machine pronunciation.

11. The method of claim 10 further comprising:
generating the updated machine pronunciation of the text data according to the pronunciation correction provided by the user.

12. The method of claim 9 wherein the TTS computing device is a user computing device in communication with a TTS server.

13. The method of claim 12 further comprising transmitting the pronunciation correction to a TTS crowdsource data source of the TTS server.

14. The method of claim 13, wherein the machine pronunciation is derived from the pronunciation correction stored in the TTS crowdsource data source when a number of a plurality of pronunciation corrections exceeds a predetermined threshold.

15. The method of claim 14 further comprising determining a location of the TTS computing device, wherein the at least one phonetic rule includes determining whether the plurality of pronunciation corrections for the text data stored in the TTS crowdsource data source exceeds a predetermined threshold for a geographic area that includes the location of the TTS computing device.

16. The method of claim 9, wherein the machine pronunciation of a text data includes a first machine pronunciation according to at least one first phonetic rule and a second machine pronunciation according to at least one second phonetic rule, said method further comprising:
providing both the first and second machine pronunciation to the user interface; and
receiving the pronunciation correction from the user, wherein the pronunciation correction is at least one of the first machine pronunciation and the second machine pronunciation provided by the user.

17. A non-transitory computer readable medium that includes computer executable instructions for correcting pronunciation in a text-to-speech (TTS) system, wherein when executed by a TTS computing device comprising at least one processor in communication with at least one memory device, the computer executable instructions cause the TTS computing device to:

generate a machine pronunciation of a text data according to at least one phonetic rule;

provide the machine pronunciation to a user interface of the TTS computing device such that the machine pronunciation is audibly communicated to a user of the TTS computing device;

receive a pronunciation correction of the machine pronunciation from the user via the user interface;

determine a first geographic location indicating where the pronunciation correction was provided by the user to the user interface;

store the pronunciation correction and the first geographic location in a TTS data source;

assign the pronunciation correction provided by the user to a user profile that corresponds to the text data;

determine a second geographic location indicating where the TTS computing device is currently located;

provide, to the user interface, the machine pronunciation if the second geographic location is outside of a predetermined distance of the first geographic location; and provide, to the user interface, an updated machine pronunciation based on the pronunciation correction if the second geographic location is within the predetermined distance of the first geographic location.

18. The non-transitory computer readable medium of claim 17, wherein the TTS computing device is a user computing device in communication with a TTS server.

* * * * *